United States Patent [19]

Zeh

[11] Patent Number: 4,645,256
[45] Date of Patent: Feb. 24, 1987

[54] GRAVITY ACTUATED GRIPPER

[75] Inventor: Horst Zeh, Karlsruhe, Fed. Rep. of Germany

[73] Assignee: Wiederaufarbeitungsanlage Karlsruhe Betriebsgesellschaft mbH, Eggenstein-Leopoldshafen, Fed. Rep. of Germany

[21] Appl. No.: 672,179

[22] Filed: Nov. 15, 1984

[30] Foreign Application Priority Data

Nov. 24, 1983 [DE] Fed. Rep. of Germany ....... 3342471

[51] Int. Cl.$^4$ .......................... B66C 1/66; G21C 19/10
[52] U.S. Cl. ...................................... 294/86.4; 294/906
[58] Field of Search ................. 294/86.4, 86.14, 86.22, 294/86.17, 86.26, 86.33, 906, 95; 414/146; 376/268, 271

[56] References Cited

U.S. PATENT DOCUMENTS 3,175,854  3/1965  Lee et al. .............................. 294/906

FOREIGN PATENT DOCUMENTS 732079  4/1966  Canada ................................ 294/906
1284526 12/1968  Fed. Rep. of Germany .

*Primary Examiner*—James B. Marbert
*Attorney, Agent, or Firm*—Spencer & Frank

[57] ABSTRACT

A gravity actuated gripper includes two concentrically interleaved shells which are displaceable with respect to one another in two positions for gripping molds containing radioactive material, with the fill opening or upper edge of the molds being provided with a circumferential carrying ring behind which engage balls to perform the gripping. The gripper is intended to be particularly robust and assure high operational reliability under all conditions. For this purpose, a special control is provided for the two positions, the control including a switching ring which corresponds with rings of crown teeth attached to both shells. Due to the special configuration of the teeth and an up-and-down movement of the switching ring, the two shells can take on a gripping position and a release position.

2 Claims, 7 Drawing Figures

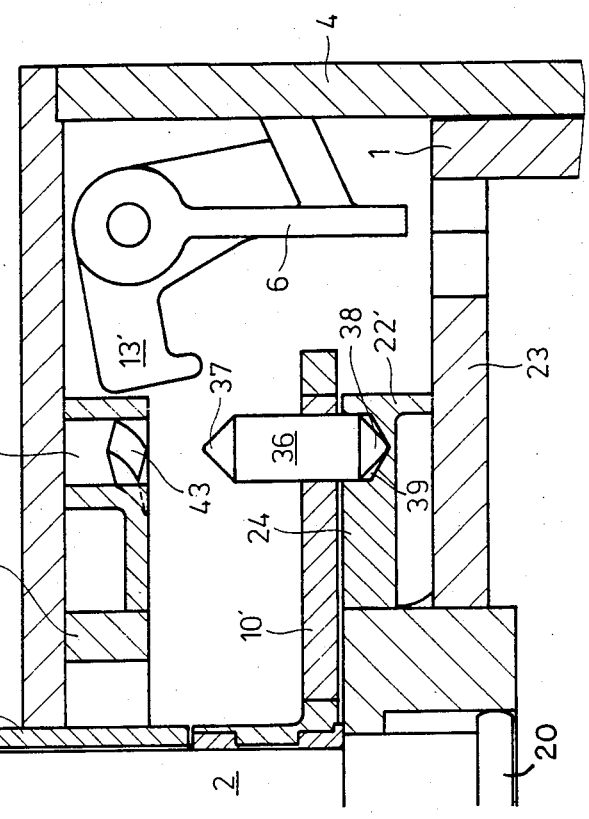
Fig. 4B
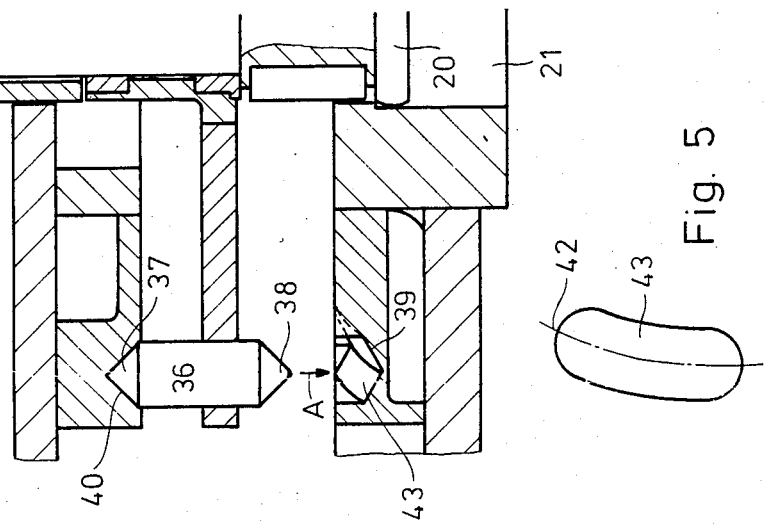
Fig. 4A
Fig. 5

4,645,256

GRAVITY ACTUATED GRIPPER

BACKGROUND OF THE INVENTION

The present invention relates to a gravity actuated gripper for gripping loads or molds containing radioactive substances, and more particularly to a gripper of the type having concentrically disposed lockable shells which are displaceable with respect to one another between two positions, the inner shell having recesses and the outer shell having a groove; balls which are seated in the recesses of the inner shell and which can be pressed partially into the interior of the inner shell by the outer shell, and thus into locking relationship with the load or mold, or which can lie completely within the recesses or in the groove in the outer shell; and a mechanical control device between the shells to fix the positions thereof, the mechanical control device being operated by raising and lowering the gripper.

Such a gripper is known from German Auslegeschrift No. 1,284,526. This known gripper is controlled and locked in its two end positions, "Locked" and "Release", by means of a ball which rotates in a groove disposed between the two sleeves. It is relatively complicated to manufacture a gripper which is controlled by means of such a groove, and moreover the gripper is unreliable in operation since corrosion may impede the mobility of the ball.

SUMMARY OF THE INVENTION

It is the object of the present invention to provide a gripper which does not exhibit such sensitivities and which always exhibits a high degree of operational reliability under all operating conditions.

In accordance with the present invention this object can be attained by providing two nested, cup-shaped shells having upwardly oriented end members, the end member of the outer shell having an opening and the end element of the inner shell having a central hub; a central shaft having a collar which supports the inner shell and which is mounted in the central hub so as to be axially displaceable, the shaft extending through the opening in the end member of the outer shell and terminating upwardly in an eye element; a lower ring of crown sawteeth having bottoms of uniform design, or a lower ring of individual recesses having lateral bevels with depth profiles of uniform design, on the central hub surrounding the shaft; a further ring of crown sawteeth or individual recesses with bevels affixed to the end member of the outer shell around the shaft, said further ring being rotated by half a pitch with respect to the lower ring, at least one tooth bottom or recess of the further ring being deeper than the rest; a switching ring rotatably mounted on the shaft at a fixed axial position with respect thereto, said switching ring being disposed between the lower ring and further ring; and at least one upwardly or downwardly oriented tooth which is provided on the switching ring and which can be inserted into the crown teeth or recesses, or a ring of vertical pins which are provided on the switching ring and which in two positions come into engagement with the crown teeth or recesses, the lengths of the teeth or pins provided on the switching ring being less than the shortest distance beween the rings of crown teeth or between the rings of recesses with bevels.

A gripper of such design has the advantage that, on the one hand, it can be actuated very easily without external means and, on the other hand, always assures high operational reliability. Additionally, the gripper is of particularly simple and robust construction and is therefore manufactured economically.

BRIEF DESCRIPTION OF THE DRAWINGS

FIGS. 4A and 4B are partial sectional views of a second embodiment of the gripper of the present invention, having a different switching ring.

FIG. 5 schematically illustrates a recess having an elongated bevel to cooperate with the switching ring of the embodiment of FIG. 4.

DESCRIPTION OF THE PREFERRED EMBODIMENT

Figure 1A:
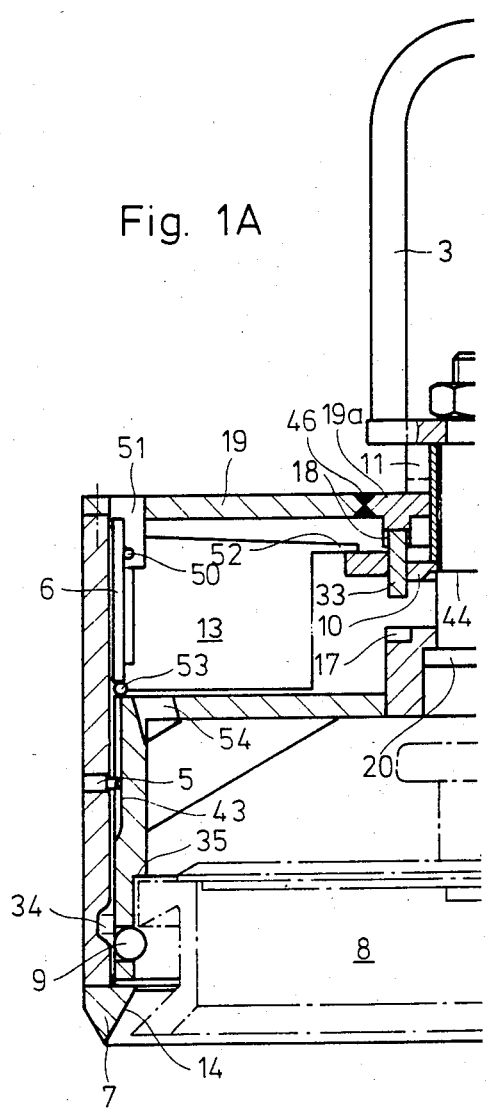
FIGS. 1A and 1B are longitudinal sectional views of a first embodiment of the gripper of the present invention, FIG. 1A illustrating the gripper oriented to grip a mold and FIG. 1B illustrating the gripper oriented so that it does not grip the mold.
Figure 1B:
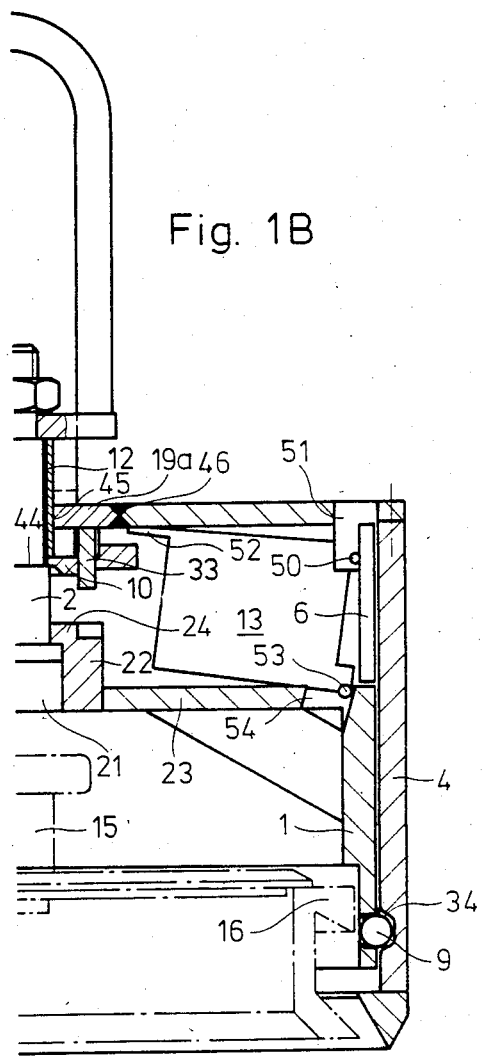

The gripper, as shown in FIGS. 1A and 1B, is intended for gripping loads and is used together with a lifting tool. The load must be provided with a carrying ring adapted to the gripping tool. In a special case, the load is a mold 8 (illustrated with dot-dash lines) with a radioactive content. On its cover, the load is provided with a mushroom-shaped carrier 15 and at its upper side with a circumferential carrying ring 16. Taking up and depositing of the load is effected automatically without external drive elements by the lifting movement of a crane hook (not illustrated) from which the gripper is suspended.

The gripper is comprised of an inner or ball shell 1 and balls 9 which produce a lock with the load, for example the mold 8, and a central shaft 2 which is screwed to an eye member 3 for the crane hook (not illustrated). An outer or arresting shell 4 is mounted above ball shell 1 so as to be axially displaceable. Guide pin 5 fixes the teeth spacing of two rings of crown teeth 17 and 18 at the arresting or ball shells 4 and 1; that is to say, pin 5 slidably extends into groove 43 in shell 1 in order to permit shells 1 and 4 to move linearly but not rotationally with respect to one another. The stroke or linear movement of ball shell 1 is limited at the top by a limiting pin 6 and at the bottom by a collar 7. The sloped portion 14 of collar 7 guides the gripper onto mold 8. Switching ring 10 is rotatably mounted on shaft 2 and is held, between the lower end of bushing 12 and a shoulder 44 provided by shaft 2, at a fixed position along the axis of shaft 2. Eye member 3 is secured against rotation by member 11, which is affixed to arresting shell 4 and slidably extends through an opening (not illustrated) in eye member 3, so as to prevent switching ring 10 from rotating inadvertently. Bushing 12 is welded to eye member 3. Shell 4 is suspended from switching ring 10 so as to be axially displaced with respect to bushing 12 and shaft 2 by lowering central shaft 2. Securing plates 13 are pivotably mounted at 50 to respective support brackets 51, which are affixed to shell 4. Each plate 13 is provided with an extension 52 which is positioned for engagement by the upper side of ring 10 and, diagonally across from extension 52, with an abutment 53. Depending upon the angular position of plate 13, abutment 53 may be located below the lower end of the corresponding pin 3, as in FIG. 1A, in order to limit the upward motion of shell 1 with respect to shell 4, or abutment 53 may be rotated to a position where it can be accommodated within opening 54, as in FIG. 1B, in order to permit increased upward motion of shell 1 with respect to shell 4. Securing plates 13 serve to block shell 4 by way of a form lock when they are positioned as illustrated in FIG. 1A.

The switching ring 10 and the associated rings of crown teeth 18 and 17 at the two shells 1 and 4 are a significant feature of the novel gripper. Switching ring 10 is seated so as to be rotatable but axially fixed in its position on central shaft 2. As will be discussed subsequently, during use of the gripper, switching ring 10 is reciprocated between the rings of crown teeth 17 and 18, which act as cams to rotate switching ring 10 about shaft 2. Shaft 2 and bushing 12 are together axially movable through opening 45 in end member 19 of the outer or arresting shell, portion 19a being joined to the remainder of member 19 by welds 46. At the lower end of shaft 2, there is an abutment collar 20 which slides in a bore 21 of hub 22, which protrudes from end member 23 of the inner or ball shell 1. Both shells 1 and 4 are cup-shaped, with shell 1 sliding in shell 4 and with end members 19 and 23 oriented adjacent one another. Between end members 19 and 23, there is disposed the switching ring 10. Abutment collar 20 is fixed, or retained, upwardly by edge 24 and thus pulls ball shell 1 up when shaft 2 is raised.

Figure 2:
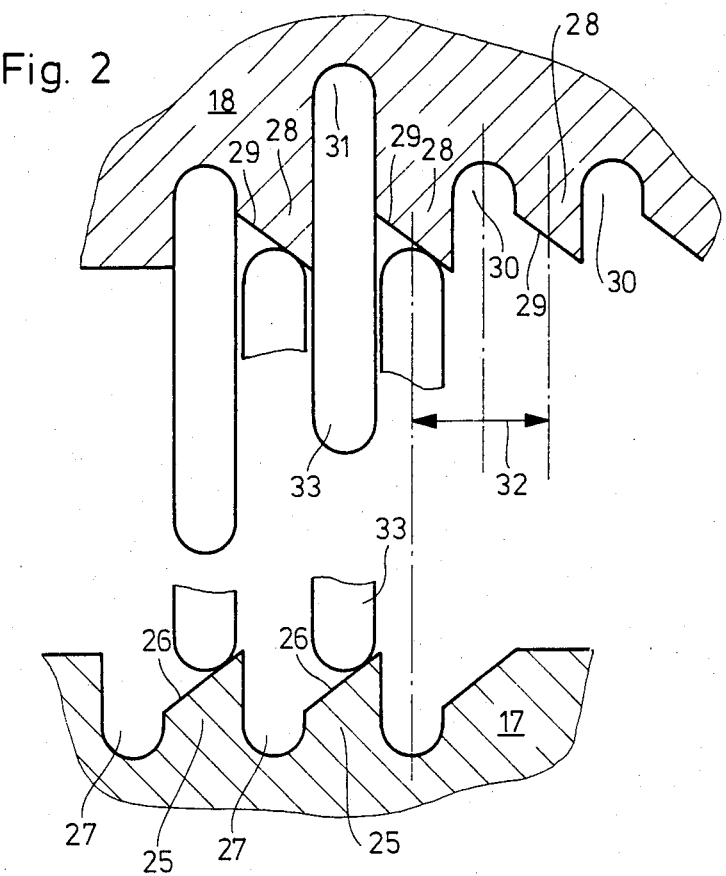
FIG. 2 schematically illustrates a sectional view of teeth on spaced-apart rings, and different positions of a tooth which moves between the rings.
Figure 3:
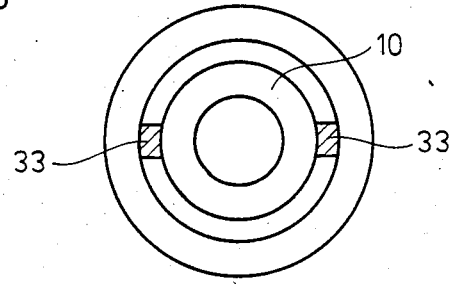
FIG. 3 is a plan view of the switching ring.

The two rings 18 and 17 of crown teeth, which are partially illustrated in schematic form in FIG. 2, differ from one another with respect to the depths of at least one of the valleys between the teeth. The lower ring 17 of crown teeth is formed of sawteeth 25 which are sloped 26 at one side. Between teeth 25 lie tooth bottoms 27, whose depth is the same for all teeth of the lower ring 17 of crown teeth.

The upper crown tooth ring 18 is likewise composed of sawteeth 28, which are sloped 29 at one side. However, they are oriented oppositely, i.e. in the other direction, with respect to slopes 26 of the lower crown teeth ring 17. Tooth bottoms 30 and 31 lie between teeth 28 of the upper ring 18. It is significant that the two rings 17 and 18 of crown teeth, when in their installed positions, are offset with respect to one another by one-half a pitch 32 of teeth 25 and 28, respectively. Teeth 33 of switching ring 10 correspond to tooth bottoms 30 and 31 and the offset permits teeth 33 to slide from, for example, tooth bottoms 30 and 31 into tooth bottoms 27, whereby switching ring 10 is rotated by half a step 32.

In FIG. 2 at the top and bottom, a tooth 33 is shown in four positions and two positions, respectively, partially broken away. Normally two oppositely disposed teeth 33 are present at ring 10.

As has already been mentioned, tooth bottoms 30 and 31 of the outer crown teeth ring 18 have different depths. Along the circumference, at least one tooth bottom 31 for every tooth 33 of ring 10 is deeper than the tooth bottoms 30, so that tooth ring 18 and the associated outer shell 4 take on a different position with respect to inner or ball shell 1. That is to say, at least one rotational position of switching ring 10 with respect to upper ring of crown teeth 18, the teeth 33 of switching ring 10 are positioned to engage bottoms 31 rather than bottoms 30, so that switching ring 10 can be raised further than usual as in FIG. 1B. This controls the position of balls 9. When teeth 33 are in the normal tooth bottoms 30, as in FIG. 1A, balls 9 are locked and cannot escape to the circumferential groove 34 of outer shell 4. In the other position—teeth 33 are engaged in deep tooth bottoms 31—balls 9 have been pushed into groove 34 and the gripper is open and can be raised from or placed onto a load, respectively (FIG. 1B).

The gripping tool or gripper operates as follows:

The eye member 3 of the gripper is suspended from a crane hook (not illustrated), with teeth 33 of ring 10 being positioned in deep bottoms 31 so that end members 19 and 23 assume their closest positions and so that abutments 53 are positioned within openings 54 rather than at the bottoms of pins 6. The gripper is then lowered by the crane onto the mold or load 8, so that collar 35 of inner shell 1 is supported on mold 8 and so that outer shell 4 together with limitation pin 5 is supported on shell 1, as is illustrated in FIG. 1B. Securing plate 13 is then not in operation, and accordingly the bottoms of pins 6 rest against the top of shell 1. If the crane hook (not illustrated) is lowered further down, central shaft 2 and switching ring 10 likewise move downwardly. This causes switching ring 10 to be released from upper crown tooth ring 18 and the weight of members 2 and 3 presses it into the lower crown tooth ring 17. This causes the teeth of the lower ring 17 to rotate switching ring 10 by one-half a step 32. When the crane hook (not illustrated) is pulled up, switching ring 10 reaches the upper tooth ring 18 and its first locked position (i.e., teeth 33 engage tooth bottoms 30, and the elements assume the position illustrated in FIG. 1A); this causes ring 10 to be rotated further by another one-half of step 32. Moreover in this position, arresting shell 4 pushes balls 9 inwardly to positions underneath supporting ring 16 so as to lock mold 8. Simultaneously with the locking of mold 8, securing plates 13 engage as a result of gravity, and abutments 53 are positioned at the bottoms of pins 6. To be able to release mold 8 again, eye member 3 must be lowered completely twice and raised up completely twice.

The mold 8 is released when teeth 33 move into engagement with deep tooth bottoms 31 as gripper 6 is being raised. During this unlocking stroke, switching ring 10 first engages extensions 52, thereby displacing abutments 53, and further upward movement of shell 1 with respect to shell 4 rotates abutments 53 into openings 54. Inner shell 1 is raised by collar 20 and outer shell 4 is raised by ring 10 until the unlocked position is reached. Balls 9 can now escape into groove 34 of arresting shell 4 at the slightest resistance on the part of supporting ring 16.

A second locked position and a second normal tooth bottom 30, respectively, are provided next to another as insurance that the load cannot be raised again without unlatching after inadvertently being deposited and remains locked (see FIG. 2, top right).

FIG. 4 shows another embodiment of the gripper, with a different switching ring 10'. All parts identical with FIG. 1 again have the same reference numerals as they had in that figure. The switching ring here no longer has any teeth 33 but is provided with pins 36, which are placed perpendicularly through its basic element, are seated in the basic member in the shape of a circular ring, and project from it at the top and bottom. Pins 36 are provided with tips 37 at the top and 38 at the bottom, which are intended to engage into the rings of individual recesses 39 and 40, 41. These recesses 39 and 40 are inserted in the hub 22' of shell 1 and end member 19' of shell 4, respectively, similarly to the rings of teeth in FIG. 1. The alternating engagement is effected by vertical displacement of ring 10' since recesses 39 are again shifted by one-half step with respect to recesses 40 and 41. Since recesses 39 and 40, 41 are each provided with bevels 43 oriented in the circumferential direction of the rings—which bevels are identical in every component and which are offset at their starting top and bottom likewise by one-half step, switching ring 10 is caused to rotate when tips 37 and 38 abut on bevels 43 during each engagement at the top and bottom by this one-half pitch, i.e. pins 36 alternatingly enter again and again into new lower recesses 39 and upper recesses 40 and 41, respectively.

The number of pins 36 corresponds to one-half the number of recesses 40, 41; they are arranged so that the pitch of the pins is double that of the recesses. Since one-half of the upper recesses (recesses 41) are deeper than the other half (recesses 40), switching ring 10 and its pins 36 enter deeper into reces 41 and perform a larger stroke than when engaging in recesses 40 so that switching and locking, respectively, of the two shells 1 and 4 with respect to one another take place in precisely the same manner as in FIG. 1.

It will be understood that the above description of the present invention is susceptible to various modifications, changes and adaptations, and the same are intended to be comprehended within the meaning and range of equivalents of the appended claims.

What I claim is:

1. A gravity actuated gripper for gripping a load having a circumferential supporting ring, comprising:
   an outer shell having a groove and having an upwardly oriented end member with an opening therein;
   an inner shell which is lockable with respect to said outer shell and which lies concentrically in the outer shell and is displaceable with respect thereto between two positions, said inner shell having an inside, an outside, and recesses extending between said inside and said outside, said inside of said inner shell being configured to receive at least a portion of the load, said inner shell additionally having an upwardly oriented end member with a central hub;
   balls which are disposed in said recesses of said inner shell and which can be pushed by said outer shell partially inside said inner shell to grippingly engage the supporting ring of the load when the load is at least partially inside said inner shell, said balls additionally being selectively moveable to one of a position wherein the balls lie completely in the recesses in said inner shell and a position wherein said balls lie partially within said grooves in said outer shell when said outer shell is positioned so that said groove therein covers said recesses from the outside;
   a central shaft having an axis and having a collar which supports said inner shell and which is mounted in said central hub so as to be axially displaceable, said shaft extending through said opening in said end member of said outer shell and terminating in an upper end;
   an eye element affixed to said upper end of said shaft; and
   mechanical control means disposed between said inner and outer shells for fixing said two positions of said shells, said mechanical control means being actuable by raising and lowering said shells, said mechanical control means including a lower ring of crown sawteeth on said central hub and surrounding said shaft, said crown sawteeth of said lower ring having a pitch, having bottoms of uniform configuration, and having cam edges facing a first direction,
   an upper ring of crown sawteeth on said end member of said outer shell around said shaft, said crown sawteeth of said upper ring having a pitch that is rotated by half a pitch with respect to the crown sawteeth of said lower ring, having cam edges facing a second direction that is opposite said first direction, and having bottoms, at least one bottom being deeper than at least one other bottom,
   a switching ring rotatably mounted on said shaft at a fixed axial position with respect thereto, said switching ring being disposed between said upper and lower rings, and
   at least one tooth mounted on said switching ring and positioned for insertion into said crown teeth of said upper and lower rings, said at least one tooth having a length that is less than the minimum distance between said upper and lower rings.

2. A gravity actuated gripper for gripping a load having a circumferential supporting ring, comprising:
   an outer shell having a groove and having an upwardly oriented end member with an opening therein, said end member additionally having an upper ring of individual recesses disposed around said opening, said recesses of said upper ring having a pitch and having lateral bevels that are oriented in a first direction, at least one recess of said upper ring being deeper than at least one other recess;
   an inner shell which is lockable with respect to said outer shell and which lies concentrically in the outer shell and is displaceable with respect thereto between two positions, said inner shell having an inside, an outside, and ball recesses extending between said inside and said outside, said inside of said inner shell being configured to receive at least a portion of the load, said inner shell additionally having an upwardly oriented end member;
   a central hub on the end member of said inner shell, said hub having a lower ring of individual recess, said recesses of said lower ring having a pitch that is rotated by half a pitch with respect to the pitch of the recesses of said upper ring and having lateral bevels that are oriented in a second direction that is opposite said first direction, all of the recesses of the lower ring being substantially of a uniform depth;
   balls which are disposed in said ball recesses of said inner shell and which can be pushed by said outer shell partially inside said inner shell to grippingly engage the supporting ring of the load when the load is at least partially inside said inner shell, said balls additionally being selectively moveable to one of a position wherein the balls lie completely in the ball recesses in said inner shell and a position wherein said balls lie partially within said groove in said outer shell when said outer shell is positioned so that said groove therein covers said ball recesses from the outside;
   a central shaft having an axis and having a collar which supports said inner shell and which is mounted in said central hub so as to be axially displaceable, said shaft extending through said opening in said end member of said outer shell and terminating in an upper end;

an eye element affixed to said upper end of said shaft; and mechanical control means disposed between said inner and outer shells for fixing said two positions of said shells, said mechanical control means being actuable by raising and lowering said shells, said mechanical control means including a switch ring rotatably mounted on said shaft at a fixed axial position with respect thereto, said switching ring being disposed between said upper and lower rings, and a ring of vertically disposed pins mounted on said switching ring and positioned to come into engagement with said upper and lower rings of individual recesses, said pins having lengths that are less than the minimum distance between said upper and lower rings of recesses.

* * * * *